United States Patent
Oakner et al.

(10) Patent No.: US 9,217,577 B2
(45) Date of Patent: Dec. 22, 2015

(54) DRAIN LINE ACCESS DEVICE WITH INTERIOR OVERFLOW SAFETY SWITCH

(71) Applicant: MSD Research, Inc., Boca Raton, FL (US)

(72) Inventors: Stuart Oakner, Boca Raton, FL (US); Donna Oakner, Boca Raton, FL (US)

(73) Assignee: MSD Research, Inc., Boca Raton, FL (US)

( * ) Notice: Subject to any disclaimer, the term of this patent is extended or adjusted under 35 U.S.C. 154(b) by 0 days.

(21) Appl. No.: 14/615,976

(22) Filed: Feb. 6, 2015

(65) Prior Publication Data

US 2015/0153055 A1  Jun. 4, 2015

Related U.S. Application Data

(63) Continuation-in-part of application No. 14/451,589, filed on Aug. 5, 2014, now abandoned, which is a continuation-in-part of application No. 13/953,948, filed on Jul. 30, 2013, now Pat. No. 8,967,183.

(60) Provisional application No. 61/716,238, filed on Oct. 19, 2012.

(51) Int. Cl.

| | |
|---|---|
| *F16K 31/02* | (2006.01) |
| *F16K 31/18* | (2006.01) |
| *F24F 11/00* | (2006.01) |
| *F25D 21/14* | (2006.01) |
| *F24F 11/02* | (2006.01) |
| *F25B 49/02* | (2006.01) |
| *B08B 9/027* | (2006.01) |

(Continued)

(52) U.S. Cl.
CPC ............... *F24F 11/001* (2013.01); *B08B 9/027* (2013.01); *F16L 45/00* (2013.01); *F24F 11/0076* (2013.01); *F24F 11/02* (2013.01); *F24F 13/222* (2013.01); *F25B 49/02* (2013.01); *F25D 21/14* (2013.01); *F24F 2011/0054* (2013.01); *F24F 2013/227* (2013.01); *F25B 2500/04* (2013.01); *Y10T 137/4245* (2015.04); *Y10T 137/4259* (2015.04)

(58) Field of Classification Search
CPC ......... F25D 21/10; F25D 21/14; B08B 9/027; B08B 9/0328; B08B 9/035; B08B 9/0433; F16L 45/00; Y10T 137/4259; Y10T 137/4245
USPC ............... 137/240, 15.04; 134/102.2; 62/303, 62/285; 4/227.6; 340/623, 624, 625
See application file for complete search history.

(56) References Cited

U.S. PATENT DOCUMENTS

| | | | | |
|---|---|---|---|---|
| 2,684,414 | A | * | 7/1954 | Kilpatrick .................. 200/84 R |
| 3,774,187 | A | * | 11/1973 | Windham .................... 340/608 |
| 3,997,140 | A | * | 12/1976 | Mullins ........................ 251/145 |

(Continued)

*Primary Examiner* — Craig Schneider
*Assistant Examiner* — Minh Le
(74) *Attorney, Agent, or Firm* — Robert M. Downey, P.A.

(57) ABSTRACT

An access device for installation to a condensation drainage system, such as a drain line of an HVAC unit, includes a main body with at least one connecting port for sealed, fluid receiving connection to the drainage system and an open top communicating with an interior cavity. A top cover releasably secures to the main body to completely cover the open top. An overflow safety switch is removably held in operable position within the interior cavity and below the top cover. The switch senses the level of condensate liquid accumulating with the interior cavity and sends an electronic signal to disable the condensation producing equipment if the liquid reaches a predetermined level.

15 Claims, 11 Drawing Sheets

(51) Int. Cl.
  *F16L 45/00*  (2006.01)
  *F24F 13/22*  (2006.01)

(56) References Cited

U.S. PATENT DOCUMENTS

| | | | | |
|---|---|---|---|---|
| 4,037,193 A * | 7/1977 | Uemura | | 340/450 |
| 4,305,285 A * | 12/1981 | Kubota et al. | | 73/308 |
| 4,867,334 A * | 9/1989 | Robertson et al. | | 220/243 |
| 4,962,370 A * | 10/1990 | Borriello | | 340/623 |
| 5,281,858 A * | 1/1994 | Langved | | 307/118 |
| 5,623,251 A * | 4/1997 | Clark | | 340/603 |
| 5,850,175 A * | 12/1998 | Yeilding | | 340/431 |
| 5,959,250 A * | 9/1999 | Daoud | | 174/650 |
| 6,028,521 A * | 2/2000 | Issachar | | 340/624 |
| 6,442,955 B1 * | 9/2002 | Oakner et al. | | 62/150 |
| 6,513,378 B1 * | 2/2003 | Love, Jr. | | 73/313 |
| 6,698,215 B2 * | 3/2004 | Bush | | F24F 13/222 |
| | | | | 248/213.2 |
| 6,745,580 B1 * | 6/2004 | Brown | | 62/129 |
| 6,976,367 B2 * | 12/2005 | Spanger | | 62/129 |
| 7,686,034 B1 * | 3/2010 | Coogle | | 137/558 |
| 7,762,415 B2 * | 7/2010 | Matsui | | 220/4.02 |
| 8,013,245 B2 * | 9/2011 | Korcz et al. | | 174/66 |
| 8,082,785 B2 * | 12/2011 | Rudd | | 73/313 |
| 8,110,743 B2 * | 2/2012 | Drane | | 174/67 |
| 8,586,864 B1 * | 11/2013 | Shotey et al. | | 174/66 |
| 2005/0166613 A1 * | 8/2005 | Oakner et al. | | 62/150 |
| 2006/0096307 A1 * | 5/2006 | Coogle | | 62/272 |
| 2006/0096638 A1 * | 5/2006 | Coogle | | 137/268 |
| 2006/0096639 A1 * | 5/2006 | Coogle | | 137/268 |
| 2006/0208915 A1 * | 9/2006 | Oakner et al. | | 340/620 |
| 2011/0085919 A1 * | 4/2011 | Williams et al. | | 417/63 |
| 2012/0000233 A1 * | 1/2012 | Eads | | 62/303 |

* cited by examiner

DRAIN LINE ACCESS DEVICE WITH INTERIOR OVERFLOW SAFETY SWITCH

This patent application is a Continuation-In-Part of patent application Ser. No. 14/451,589 filed on Aug. 5, 2014, which is a Continuation-In-Part of patent application Ser. No. 13/953,948 filed on Jul. 30, 2013, which is based on provisional patent application Ser. No. 61/716,238 filed on Oct. 19, 2012.

BACKGROUND OF THE INVENTION

1. Field of the Invention

This invention relates to an access device for inline installation to drain lines and other fluid transfer conduits and, more particularly, to an inline access device that allows for cleaning and removing clogs in air conditioning and refrigeration condensate drain lines and other fluid transfer lines, and wherein the access device is equipped with an internal overflow safety switch.

2. Discussion of the Related Art

In various systems and equipment, there is a need to transfer and/or drain liquid from the equipment to a separate location. For example, in air conditioning and refrigeration systems, condensation naturally occurs as warm, humid air passes over the exterior of the evaporator coil in the HVACR unit. Typically, the condensation drips from the evaporator coil into a condensate collection pan positioned below the evaporator coil. From the collection pan, the liquid condensate is directed through a drain line that leads to an appropriate discharge location, such as the exterior of a building. It is not uncommon for these and other types of drain lines to occasionally become partially or completely clogged, resulting in a backup of condensate liquid in the drain line and the collection pan of the HVACR unit. In particular, the slow and continuous movement of condensate liquid through the drain line (i.e., by gravity transfer) encourages the growth and accumulation of algae, bacteria, dust, corrosive residue and other debris that builds up in the drain line and eventually causes a partial or complete blockage. The backup of condensate in the drain line and collection pan can result in an accidental overflow of condensate during the continuous operation of the HVACR equipment, possibly resulting in extensive and costly damage to the building structure and contents. This is a common problem that is well known in the industry.

In order to avoid clogs and accidental condensate overflows in HVACR condensate drain lines, it is recommended that the drain lines be cleaned (i.e., cleared of debris and residue) at least twice a year during normal maintenance procedures. Typically, cleaning of drain lines is achieved by introducing a pressurized flow of liquid or gas through one end of the drain line which serves to push debris, residue and blockages through the drain line and out through the opposite end. In most instances, when using a pressurized flow through the drain line for cleaning, it is desirous to gain access to the upper end of the condensate drain line near the air conditioner or refrigeration unit so that the pressure may be applied at the upper end, while pushing the clogging materials out through the opposite end, usually at an exterior of the building. Access to the upper end of the drain line requires detaching the drain line from the air conditioning or refrigeration unit and then replacing the drain line wherein the maintenance is completed. In many instances, access to the drain line can only be achieved by cutting the drain line near the HVACR unit to create an open end for injection of a pressurized gas or fluid. After cleaning, the cut drain line must then be repaired by inserting a connecting joint. This repair process compromises the water tight integrity of the drain line, and can often result in leaks at the repair joint.

In order to overcome the above-described problems associated with drain line clogs and maintenance for cleaning drain lines in HVACR systems, others have proposed for the installation of permanent inline assemblies that allow for access to the drain line to inject pressurized gas or liquid without the need of separating the drain line from the equipment or cutting the drain line. These various inline assemblies typically employ the use of a manually operated ball valve or gate valve that is closed during the clean out procedure so that the forced flow of gas or liquid is directed in one direction, usually away from the HVACR equipment. Use of a valve is advantageous in order to close off the drain line between the valve and a clog in the line. The pressurized flow of gas or liquid can then be introduced into the drain line between the closed valve and the clog, creating sufficient pressure to push the clog out through the line until the drain line is completely cleared of debris and clogging residue. However, after the cleanout procedure, the manually operated valve must be opened by the service person, otherwise the closed valve will act as a clog by preventing flow and draining of condensate liquid through the drain line to the desired discharge location.

The need to operate a manual shut-off valve in the various inline drain flushing systems of the related art presents several problems. In particular, the rotational force exerted on the manual valve control can cause bending or breaking of the drain line pipe and/or connecting joints, especially over time when the valve accumulates residue and tends to stick and resist movement. Eventually, the valve would need to be replaced which requires cutting the drain line at two locations. Another major concern with use of manually operated shut-off valves along an HVACR drain line is human error. If the service person forgets to re-open the valve after cleaning the drain line, the liquid condensate will not be permitted to drain out from the drain line and will, instead, back up into the HVACR unit drain pan, possibly resulting in an accidental overflow as the HVACR unit continues to operate.

Considering the foregoing problems and limitations associated with existing drain line clearance methods and devices, there exists a need for a drain line access device that is structured for inline installation to an existing drain line without obstructing the flow of drain line contents, and which permits convenient flushing of the drain line in both upstream and downstream directions. There is a further need for a drain line access device that includes an overflow safety switch within the housing of the device for disabling operation of an HVAC unit or other equipment connected to the drain line in the event of a clog/obstruction in the drain line that results in a back-up of liquid flow into the access device.

OBJECTS AND ADVANTAGES OF THE INVENTION

Considering the forgoing, it is a primary object of the present invention to provide inline access to fluid transfer lines, such as drain lines in HVACR systems, for purposes of cleaning (e.g., flushing) the lines without disrupting the integrity of the lines and without the need to manually operate shut-off valves to perform the cleaning.

It is a further object of the present invention to provide a drain line access device that allows for easy connection of a compressed gas or liquid delivery source to clean the line and clear any clogs.

It is still a further object of the present invention to provide a drain line access device for cleaning fluid transfer lines and clearing clogs either upstream or downstream of the device.

It is yet a further object of the present invention to provide a drain line access device that has an easily removable cover for providing convenient access and insertion of adapters for flushing the drain line in either direction without cutting, damaging or disrupting the fluid transfer line (e.g., drain line).

It is still a further object of the present invention to provide a drain line access device that is equipped with an internal overflow safety switch to disable an HVAC unit or other equipment connected to the drain line in the event of a clog/obstruction in the drain line.

It is still a further object of the present invention to provide a drain line access device that is equipped with an internal overflow safety switch that can be easily removed to allow unobstructed access to the drain line for flushing and clearing a clog in either the upstream or downstream direction, and wherein the overflow safety switch is easy replaced and sealed within the housing of the access device for normal operation.

These and other advantages of some embodiments are more readily apparent with reference to the detailed description and accompanying drawings.

SUMMARY OF THE INVENTION

The present invention is directed to an access device for inline installation to a drain line in a fluid transfer system. In one preferred embodiment, the access device is connected to a drain line extending from an air handler unit of an HVAC system to allow easy and convenient access to the drain line in order to clear a clog/obstruction in the drain line or to add clog preventing agents on a periodic basis. The access device includes a main body having connection ports on opposite ends for inline installation to the drain line (between the condensation producing source and drain discharge). The device includes a removable top cover and an adapter that is sized and configured for insertion into the interior cavity of the main body and fitted receipt within the inside of one of the input or outlet ports (upstream or downstream direction). The adapter allows for connection of virtually any pressurized gas or liquid flow source, or a vacuum source, as well as pouring of a liquid (e.g. anti-clogging agent) either upstream or downstream in the drain line for flushing out and/or preventing a clog in the drain line. A further embodiment of the device includes a main body having one connection port for connection with the auxiliary outlet of a drain pan.

The access device of the present invention further includes an overflow safety switch and/or liquid level sensor and alarm (e.g. float switch) that is removably supported within an interior chamber of the main body of the access device for detecting a clog/obstruction in the drain line. In a preferred embodiment, the overflow safety switch is electrically wired to the HVAC unit for disabling operation of the HVAC unit in the event of a clog/obstruction in the drain line that results in liquid flow backing up into the access device.

In a preferred embodiment, the overflow safety switch is a float switch and is supported within the interior chamber of the access device by a removable bracket that has a C-clip for attachment to the tubular body of the float switch. The tubular body has an arrangement of vertically spaced grooves (preferably three grooves) that allow for selective adjustment of the height of the float switch within the interior chamber of the access device. The electrical wires of the float switch extend out through a cut-out opening in the side wall of the main body of the access device for connection to the HVAC equipment. A closure piece is epoxied or glued to the wires so that the closure piece remains attached and sealed to the wires. The closure piece is congruently shaped and configured to fit within the cut-out opening in the side wall of the main body and includes a gasket or ring seal that fits within a groove surrounding the cut-out opening in order to create a water-tight seal with the side wall and the top cover.

BRIEF DESCRIPTION OF THE DRAWINGS

For a fuller understanding of the nature of the present invention, reference should be made to the following detailed description, taken in conjunction with the accompanying drawings in which.

Like reference numerals refer to like parts throughout the several views of the drawings.

DETAILED DESCRIPTION OF THE PREFERRED EMBODIMENT

Referring to the several views of the drawings, the drain line access device of the present invention is shown and is generally indicated as 10.

Figure 1:
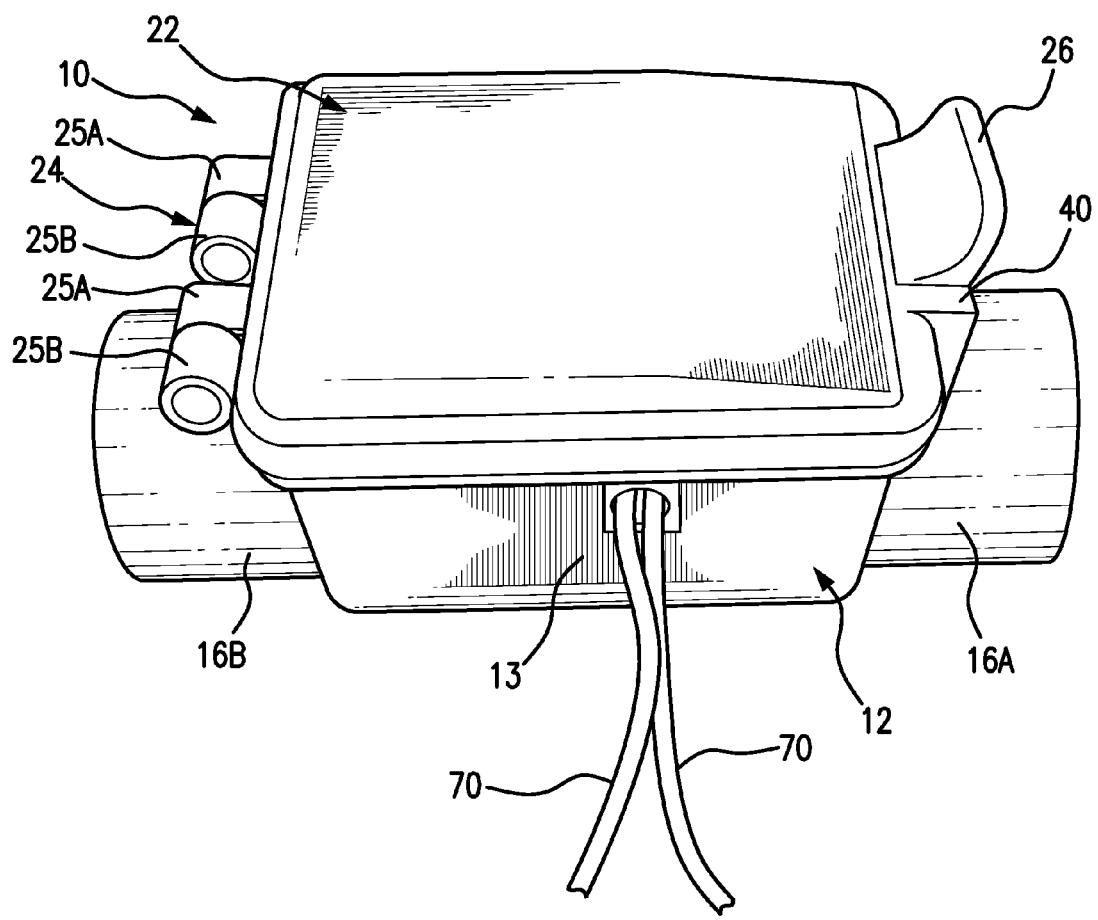
FIG. 1 is a top perspective view of the drain line access device of the present invention shown with the top cover closed and sealed to the main body and having a pair of electrical wires from an internal overflow safety switch extending out through a sealed side port.
Figure 2:
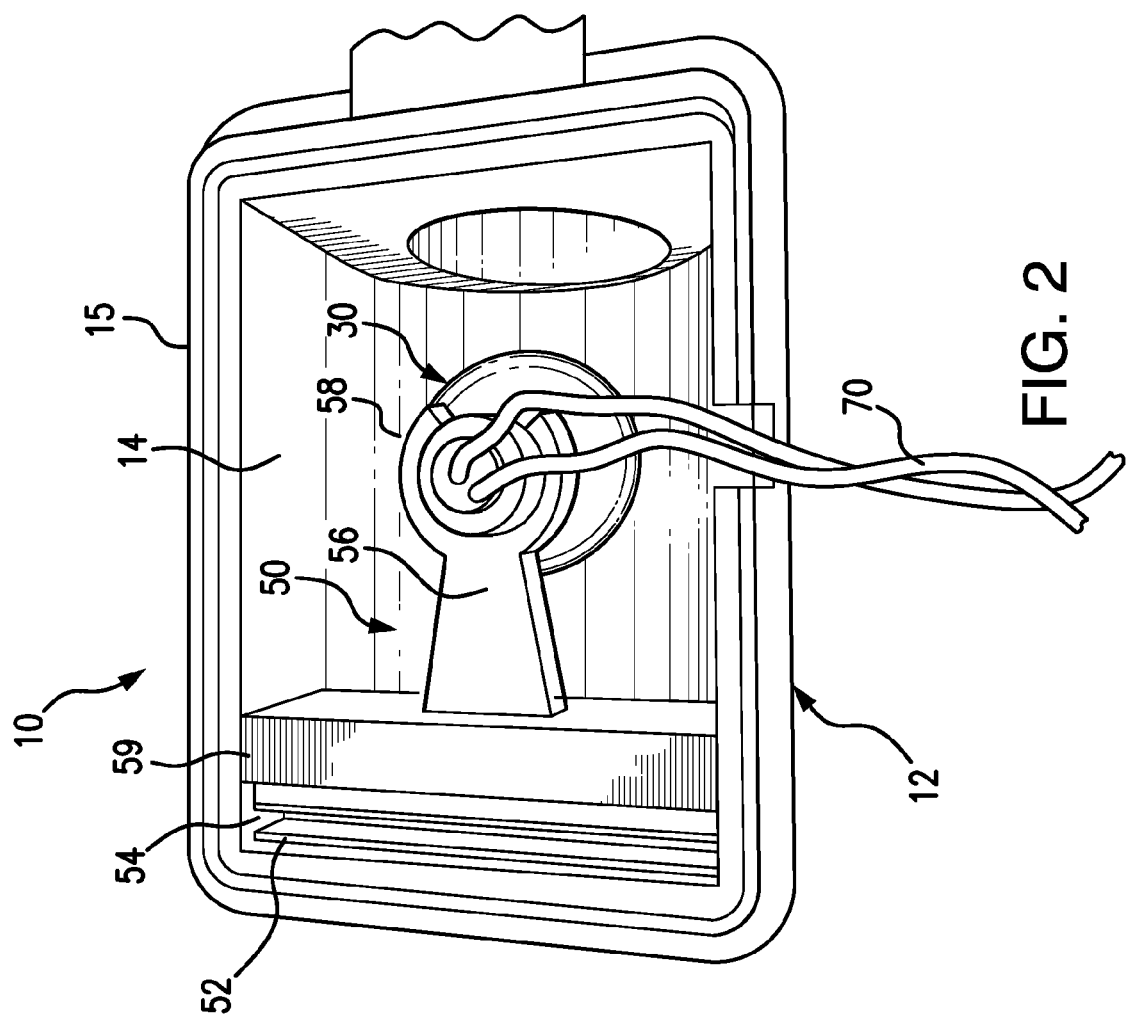
FIG. 2 is a top perspective view of the drain line access device of FIG. 1 shown with the top cover removed to reveal the overflow safety switch supported within an interior chamber of the main body by a removable bracket.

As seen in FIGS. 1 and 2, the access device 10 includes a main body 12 surrounding an interior chamber 14. The main body 12 has an input connector port 16A and an outlet connector port 16B. The input and outlet connector ports 16A and 16B are positioned on opposite ends of the main body and are each sized and configured for engaged receipt of opposing ends of a drain line extension, thereby allowing for inline installation of the access device 10 to the drain line. The top of the main body is open and is surrounded by a rim 15. In a preferred embodiment, the top rim 15 is structured for sealed engagement with a gasket 17 that is fitted within a groove in the underside of a top cover 22 that normally covers and closes the open top of the main body. In a preferred embodiment, the top cover 22 is hingedly secured to one end of the main body 12 by a double pin separating hinge assembly 24, including removable male hinge members 25A and female hinge members 25B. The top cover 22 is releasably secured to the main body 12 by a latch mechanism 26 on the end opposite to the hinge assembly 24. When secured to the main body 12, the top cover 22 covers and seals the open top of the main body 12 to define an inner channel 28 between input and outlet connector ports 16A and 16B.

In one embodiment, input port 16A attaches to a drain line extending from a condensation producing source (e.g., an air handler unit of an HVAC system) and outlet port 16B is sized and configured for engaged receipt of a drain line extension leading to a drain discharge.

Figure 7:
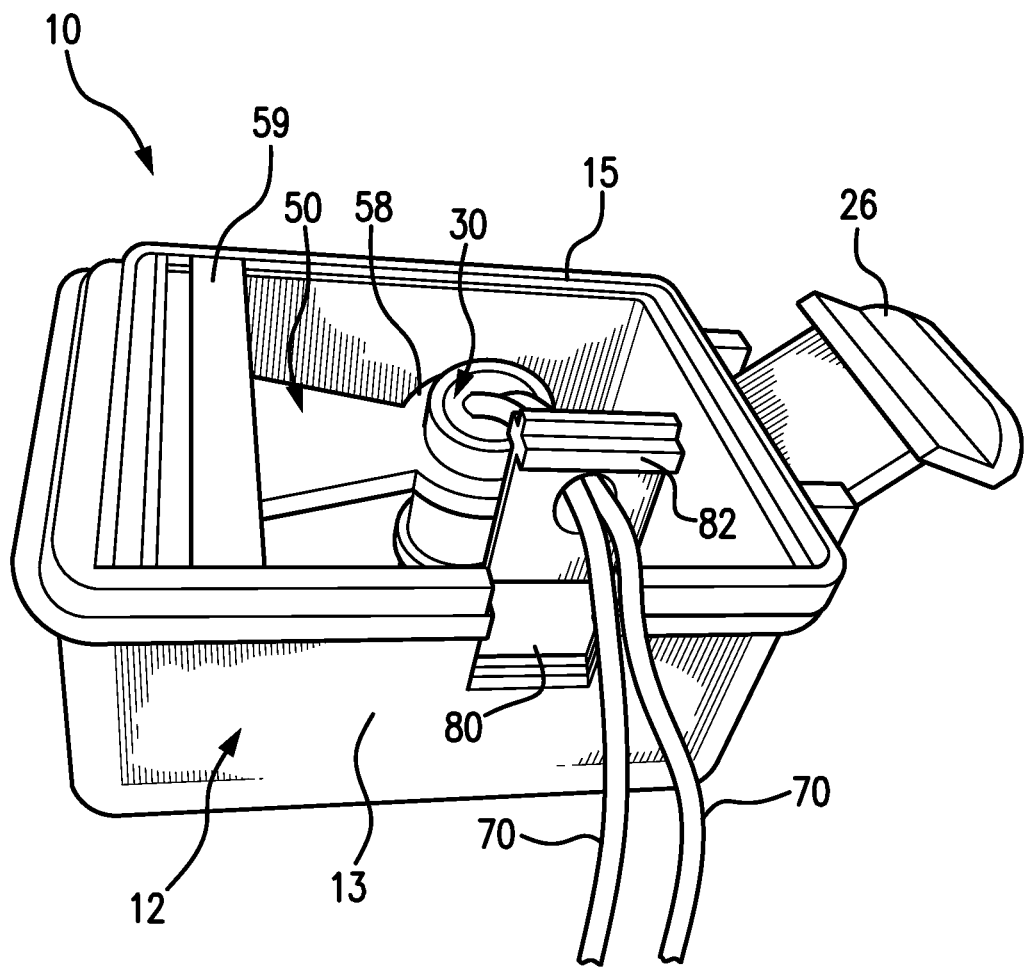
FIG. 7 is a top perspective view of the access device shown with the top cover removed and a closure piece sealed to the wires of the overflow safety switch and readily positioned for sealed receipt within a cut-out opening on the side wall of the main body.

The top cover 22 is easily opened and/or removable from the main body 12 at the double pin separating hinge assembly 24 by separating the male hinge members 25A from the female hinge members 25B. The latch 26 on the opposite end of the main body hinges upwardly into engagement with fastening member 40 on the top cover 22 for sealing the top cover 22 to the top rim of the main body and covering relation to the open top. To open or remove the top cover, the latch 26 is hingedly rotated away from the top cover 22 so that the latch separates from the fastening member 40. The top cover 22 can then be opened (and completely removed if desired) to gain access to the interior chamber of the main body as seen in FIGS. 2, 4 and 7.

Figure 3:
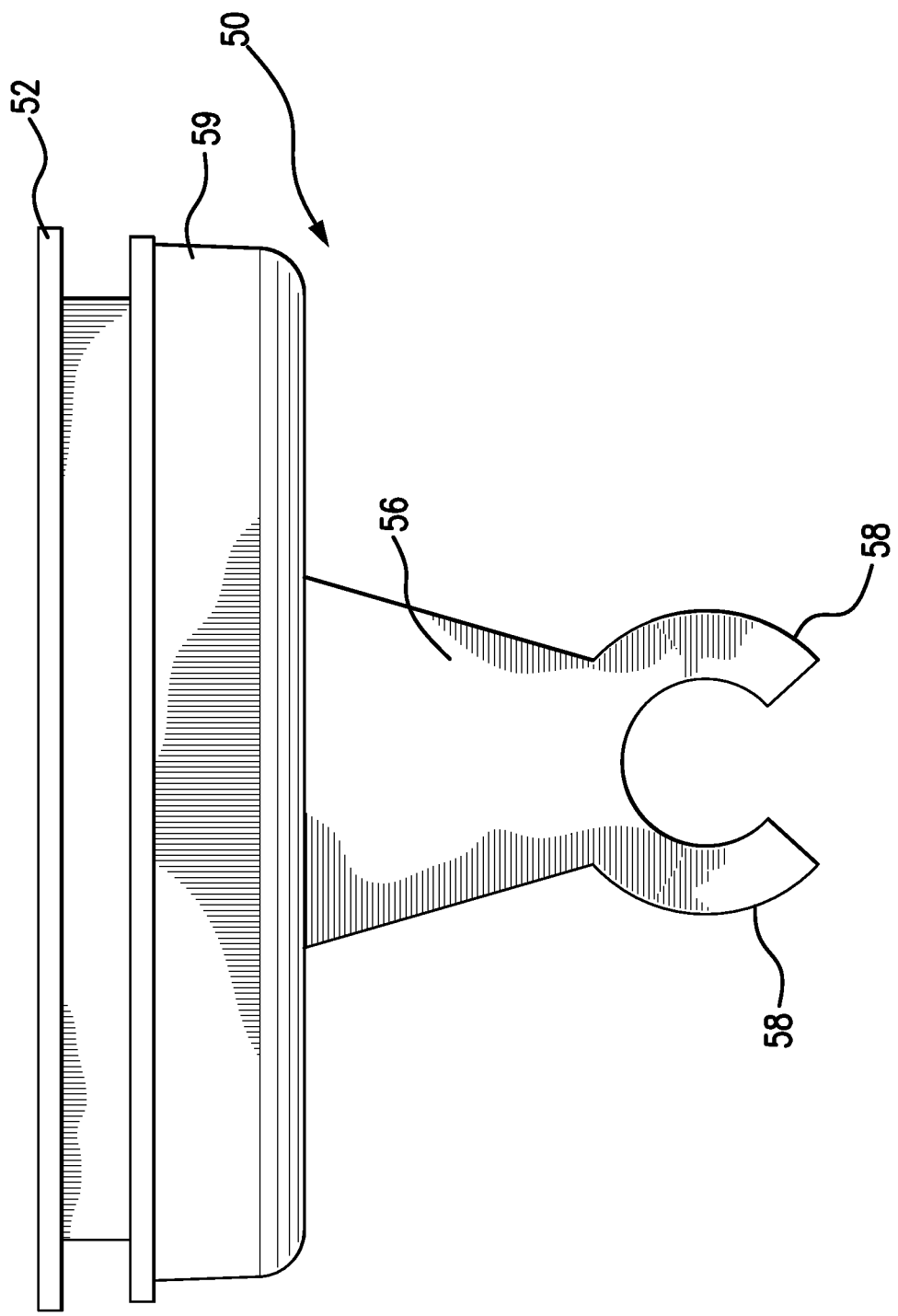
FIG. 3 is a isolated perspective view of the removable bracket.
Figure 4:
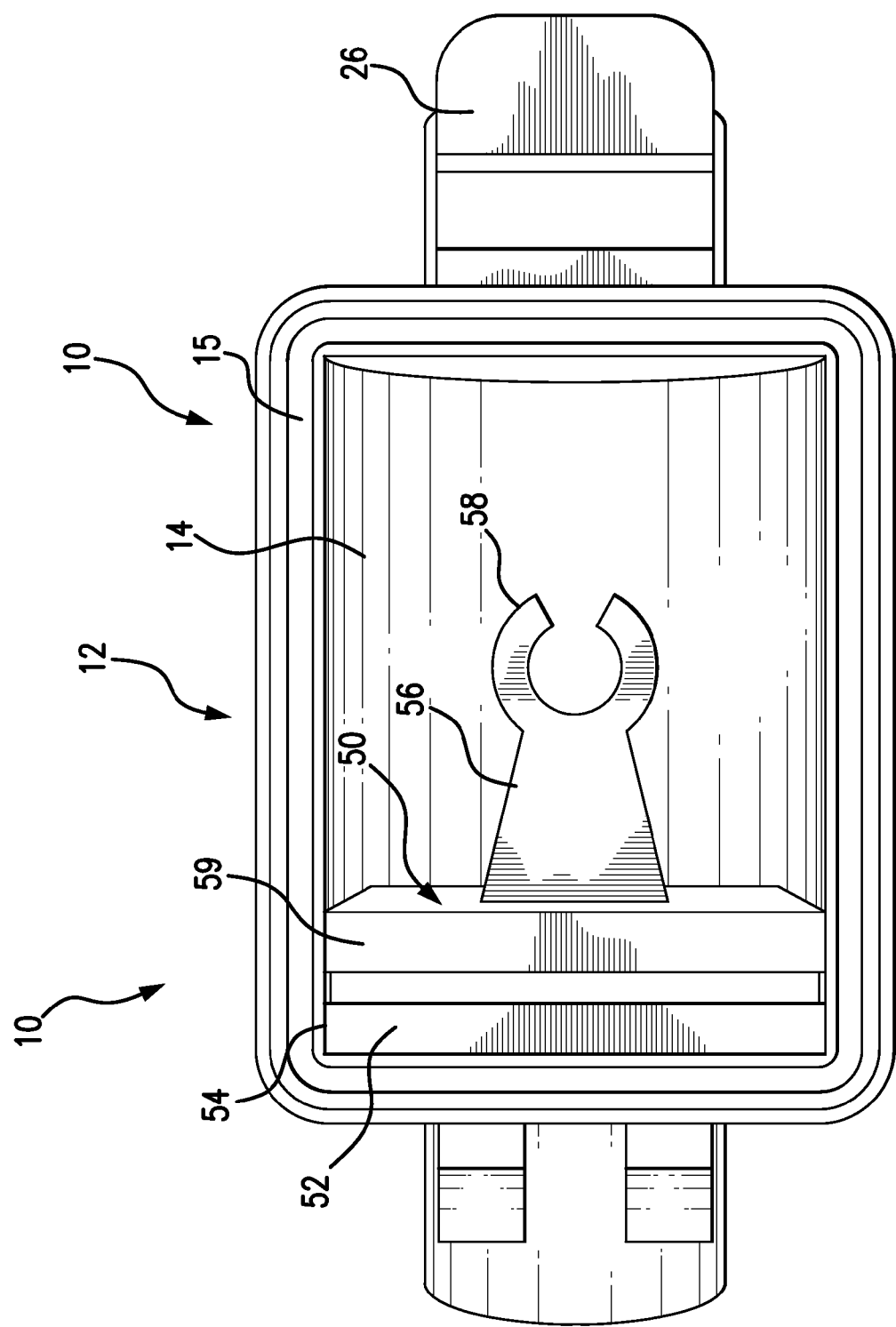
FIG. 4 is a top plan view showing the drain line access device with the top cover removed and with the removable bracket supported within a slot within the interior cavity of the main body to thereby position a C-clip on the bracket generally centered within the interior cavity for removable attachment of the overflow safety switch thereto.

Referring to FIGS. 2-4, an overflow safety switch 30 is removably supported within the interior chamber of the main body by a removable bracket 50. The bracket 50 has a mounting member 52 that is removably received within a transverse slot 54 formed within the interior chamber of the main body. When the mounting member 52 is received within transverse slot 54, the bracket 50 is secured for holding the overflow safety switch 30 in operable position within the interior chamber 14 of the access device 10. More particularly, the bracket 50 includes an arm 56 extending outwardly from the mounting member. A C-clip 58 is provided on an end of the arm 56 and is normally positioned near the center of the interior chamber, as seen in FIG. 4. The C-clip 58 is sized, structured and configured for removable, engaged receipt with the overflow safety switch 30. In a preferred embodiment, the overflow safety switch 30 is a float switch having a vertically extending hollow tubular body 32 and a buoyant annular float member 34 moveable along an outer surface of the tubular body 32 between a lower stop member 36 and an upper stop member 38. The float switch 30 may have a magnetically driven read switch within the tubular body, and wherein the annular float member 34 is provided with a magnet, whereby the magnetically driven read switch is responsive to movement of the float member 34 to close the switch and complete and electrical circuit upon the float member 34 rising to a predetermined position on the hollow tubular body 32. Other types of overflow safety switches are fully contemplated within the spirit and scope of the invention including, but not limited to, a contact switch with probes that are positioned to contact the liquid when reaching a predetermined level to thereby close the switch and send a shutoff signal to the HVAC unit or other condensation producing equipment or machinery.

Figure 5:
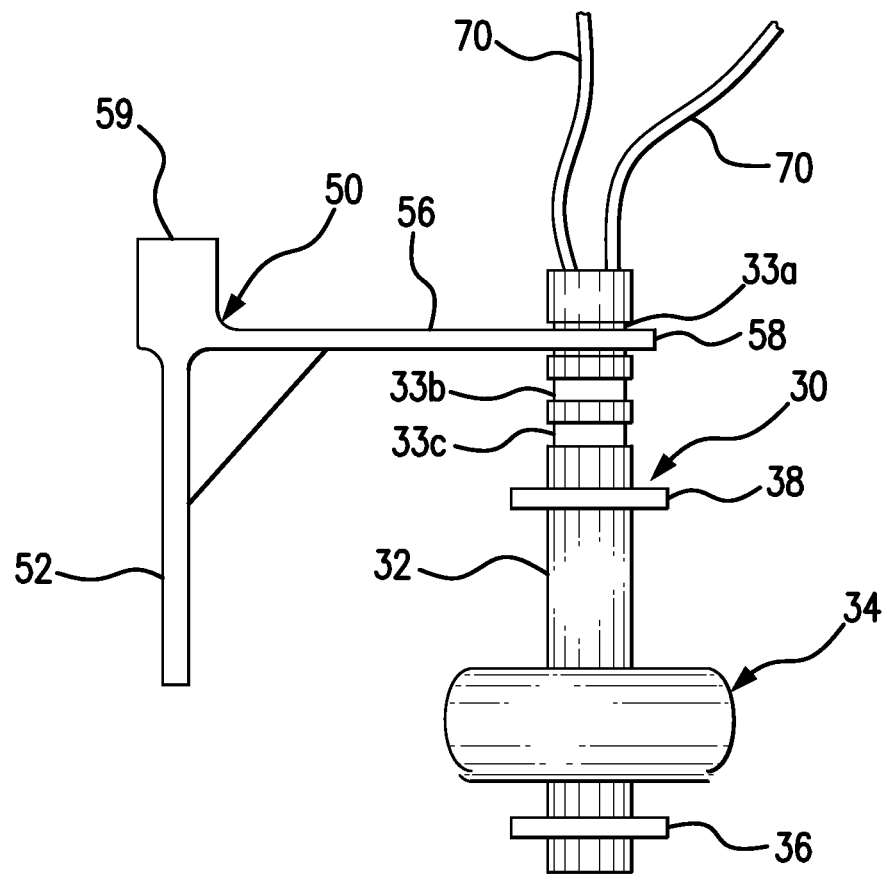
FIG. 5 is a side elevational view showing the overflow safety switch attached to the C-clip of the bracket.

As seen in FIG. 5, the C-clip 58 of the bracket 50 is removably secured to the tubular body 32 of the overflow safety switch 30 to support the overflow safety switch in a generally vertical and upright position. In a preferred embodiment, the tubular body 32 of the float switch is provided with three annular grooves 33a, 33b and 33c in vertically spaced relation from one another. Each of the three annular grooves is structured and configured for removable attachment of the C-clip 58, thereby allowing for selective attachment of the C-clip 58 of the bracket to any one of the three annular grooves for the purpose of adjusting the height of the float switch relative to a bottom (i.e., floor) of the interior chamber. For example, the bottom annular groove 33c may allow adjusted position of the float switch 30 so that the bottom end of the float switch is positioned one quarter inch above the bottom of the interior chamber 14. The second or middle annular groove 33b would allow adjustable positioning of the float switch 30 so that the bottom end of the float switch 30 is positioned one eighth of an inch above the bottom of the interior chamber 14. Finally, the top annular groove 33a would allow adjusted positioning of the flow switch 30 so that the bottom end of the flow switch 30 sits on the bottom of the interior chamber 14 of the access device 10.

As seen in FIGS. 2-4, the bracket 50 is provided with a handle 59 that allows the bracket to be easily pulled up and removed from the transverse slot within the interior chamber of the main body, thereby allowing for removal of both the bracket 50 and the float switch 30. Removal of the bracket 50 and float switch 30 allows for unobstructed access to the interior chamber 14 and the input and outlet connector ports 16A and 16B.

Figure 6A:
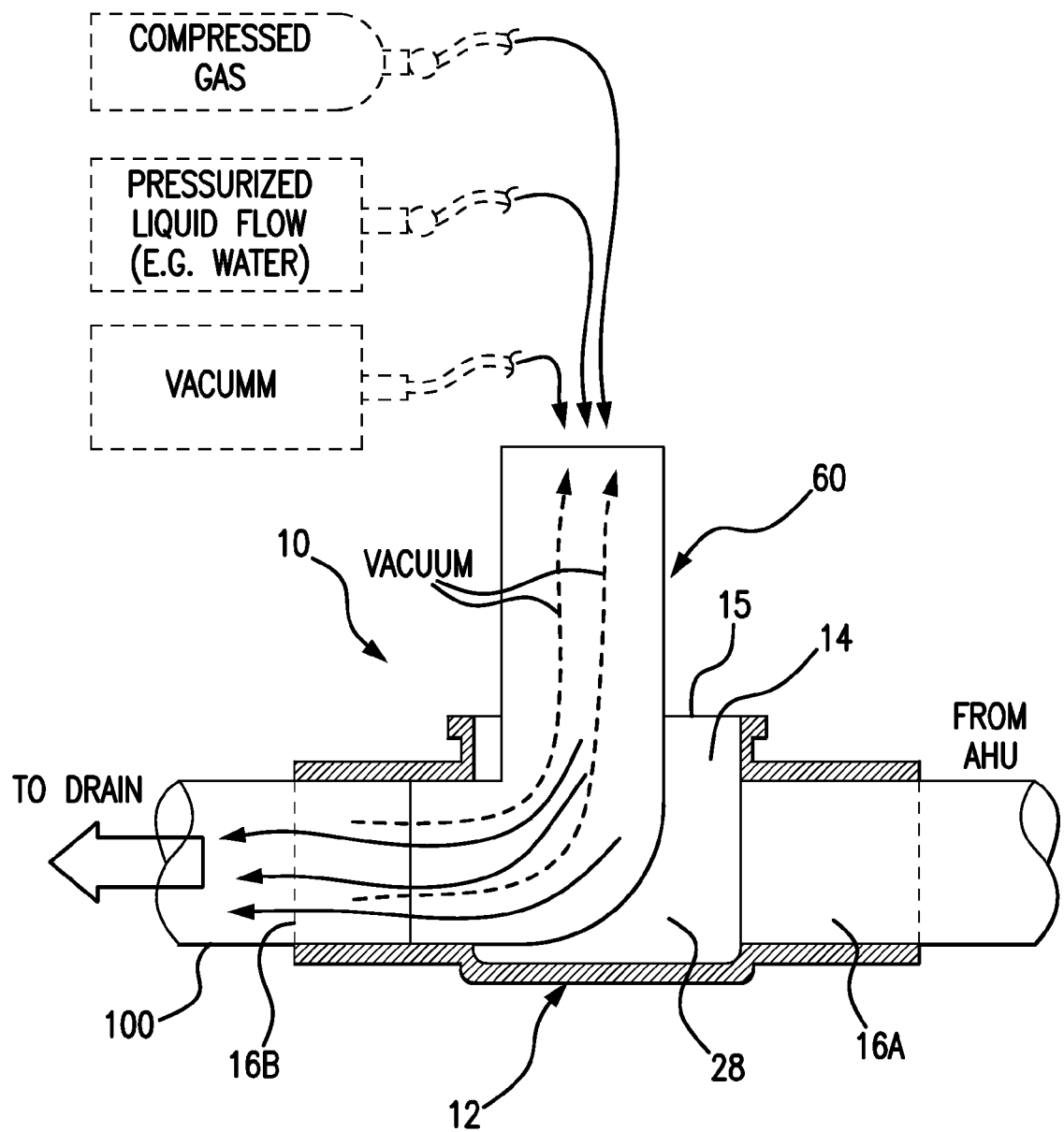
FIG. 6A is side elevational view, shown in partial cross-section, showing the main body of the access device with the top cover removed and an adaptor installed in the downstream direction of the drain line.
Figure 6B:
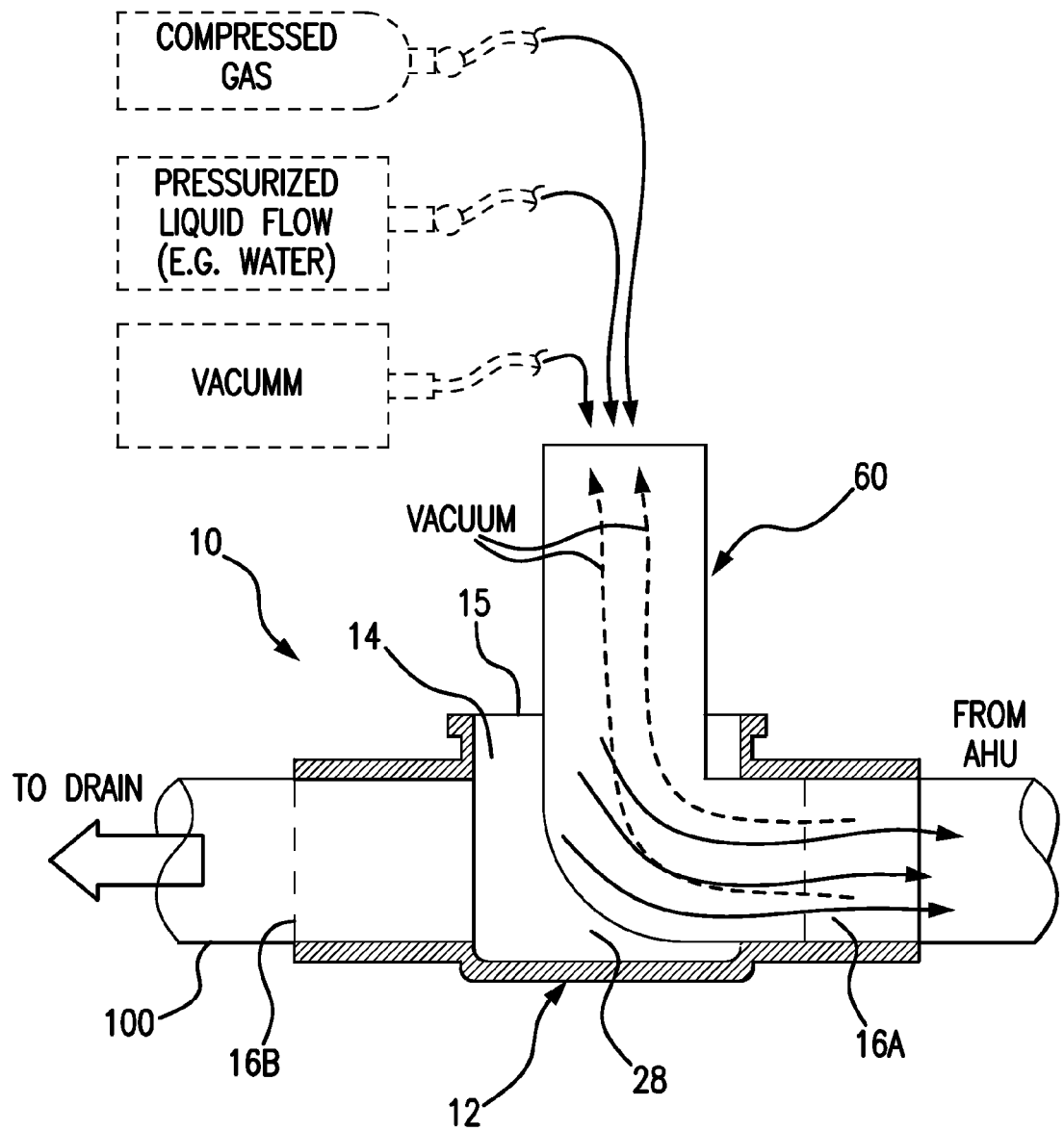
FIG. 6B is a side elevational view, shown in partial cross-section, showing the main body of the device with the top cover removed and the adaptor installed in the upstream direction of the drain line.

Referring to FIGS. 6A and 6B, a generally L-shaped (i.e., 90 degree angle) adaptor 60 is shown installed in the downstream and upstream directions, respectively, wherein the adaptor 60 engages one of the input and outlet connector ports 16A and 16B. In a preferred embodiment, the adaptor 60 is formed as a rigid tubular one-piece structure. A flow of pressurized gas is directed from a compressed gas source through the adaptor 60 and then enters one of the connector ports 16A and 16B, which is in connection with the drain line for flushing out a clog. Alternatively, a pressurized liquid flow (e.g., water) may be directed through the adapter 60 for flushing out the clog. When a vacuum force is used for clearing a clog, a vacuum may be attached to the adaptor. For each of the above applications (i.e., compressed gas, pressurized liquid flow, and vacuum), a coupling may be used between the connector hose and the adaptor 60 in order to ensure a water tight and/or air tight seal.

Figure 8:
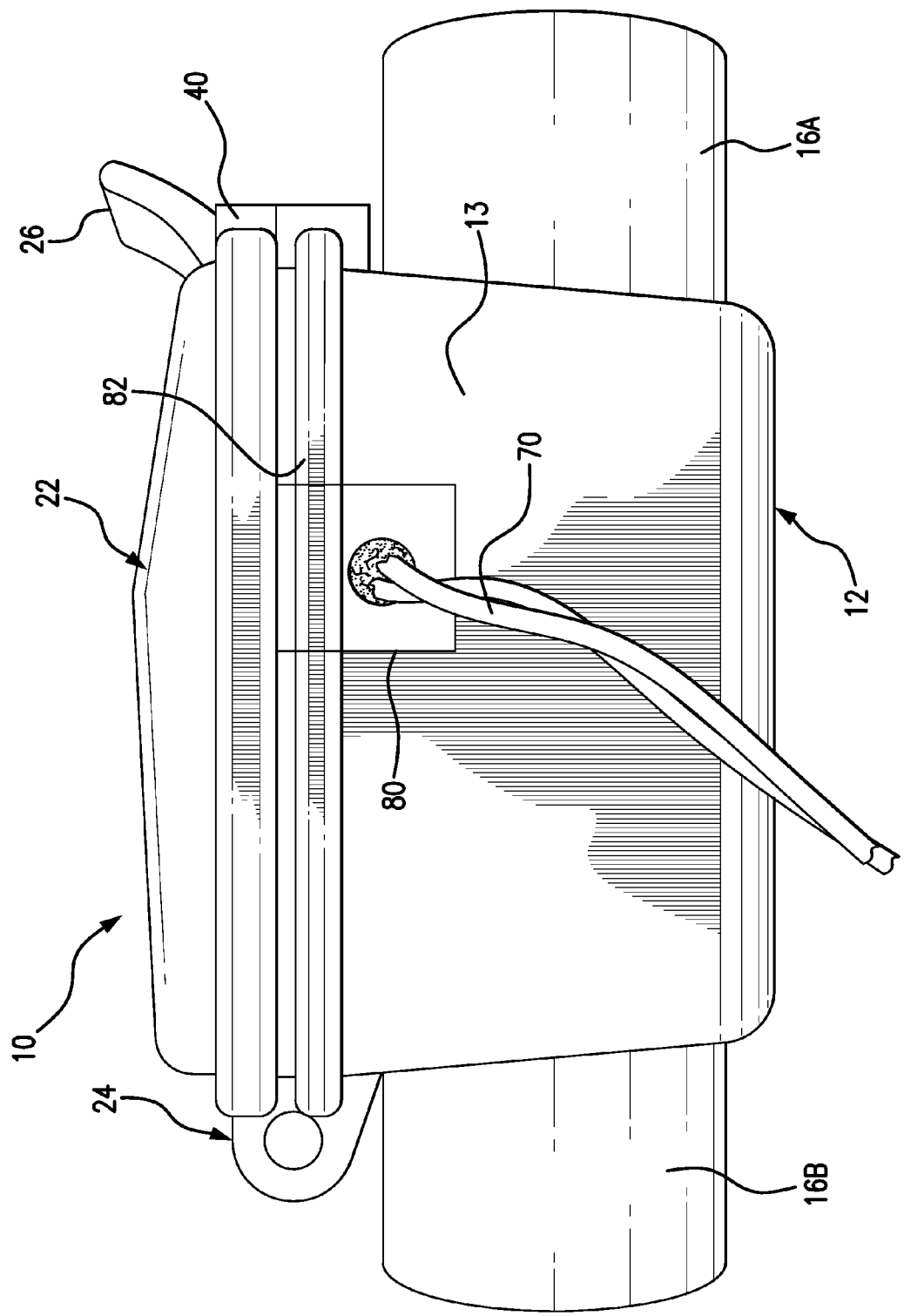
FIG. 8 is a side elevational view of the access device, with the top cover attached and sealed to the main body and the closure piece, thereby allowing the wires for the overflow safety switch to extend out through the side of the main body while maintaining a water tight seal.

Referring to FIGS. 7 and 8, the electrical wires 70 of the float switch 30 are conveniently directed out through the side of the main body of the access device 10. This allows the top cover 22 to be easily opened and/or removed and replaced without disturbing the position of the float switch 30. Thus, the top cover 22 can be opened and/or removed and the correct positioning and operation of the float switch 30 within the interior chamber 14 can be easily observed and adjusted prior to replacing the top cover. This also allows for the opening and/or removal of the top cover 22 for purposes of adding anti-clogging agents to the drain line without disturbing the position of the float switch 30. As seen in FIGS. 7 and 8, the wires 70 extend out through a cut-out opening 80 in the side wall 13 of the main body 12. A closure piece 82 is epoxied, glued or otherwise sealed to the wires 70 so that the closure piece 82 remains attached to the wires 70 with a water tight seal created between the wires 70 and the closure piece 82. The closure piece 82 is congruently shaped and configured to fit within the cut-out opening 80 in the side wall 13 of the main body 12 and includes a gasket or ring seal that fits within a groove surrounding the cut-out opening 80 where the two create a water tight seal between the closure piece 82, the side wall 13 and the top cover 22. Alternatively, a grommet or other sealing means can be used to allow for sealed passage of the wires 70 through the side wall 13 of the main body.

Figure 9:
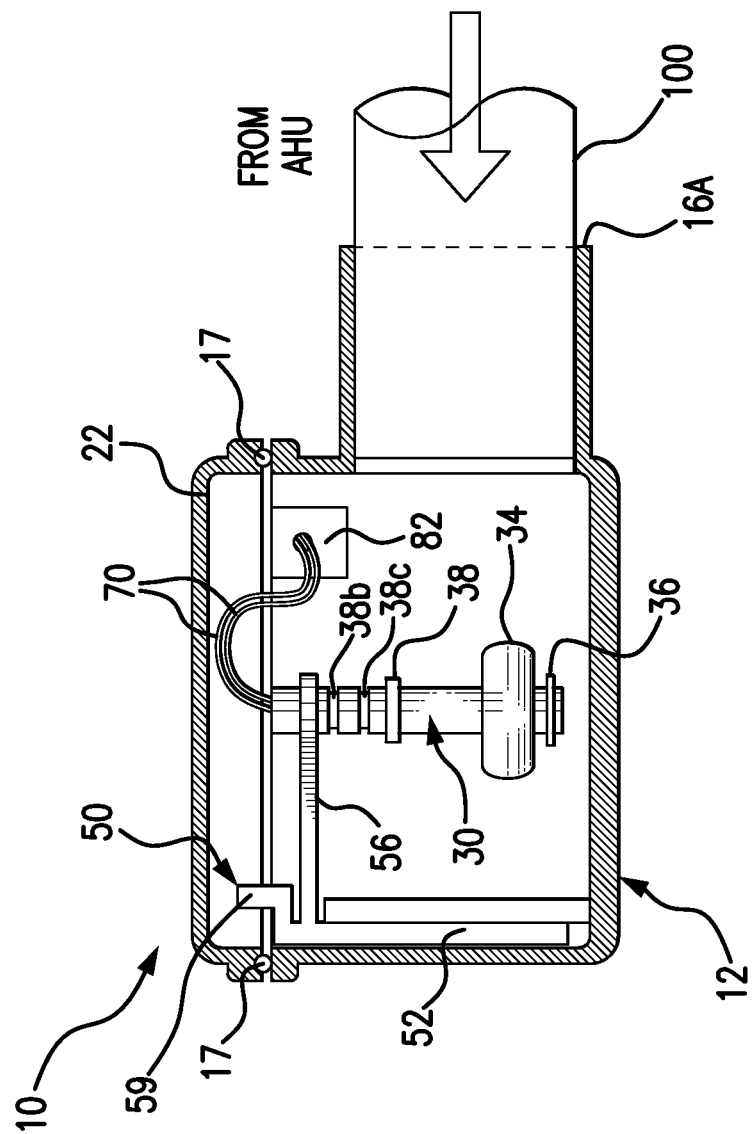
FIG. 9 is a side elevational view, shown in partial cross-section, illustrating an alternative embodiment of the drain line access device having one connector port for inline installation on a drain line or directly to a drain pan auxiliary outlet of an HVAC unit.

Referring to FIG. 9, an alternative embodiment of the device 10 is shown, wherein the main body 12 includes only one connector port 16A. Alternatively, a cap may be used to seal one of the two openings (16A or 16B) on the embodiment of the main body 12 having two connector ports 16A and 16B, as shown in FIGS. 1, 6A and 6B. This alternative embodiment of the device 10 is structured for securing to the auxiliary outlet of a drain pan. The connector port 16A may be molded with threads for screwing directly into the auxiliary outlet or, alternatively, a coupling 94 (see FIG. 10) having a lengthwise channel extending therethrough may be used for achieving a water tight and air tight connected sealed between the connector port 16A and the auxiliary outlet 100 of the drain pan.

Figure 10:
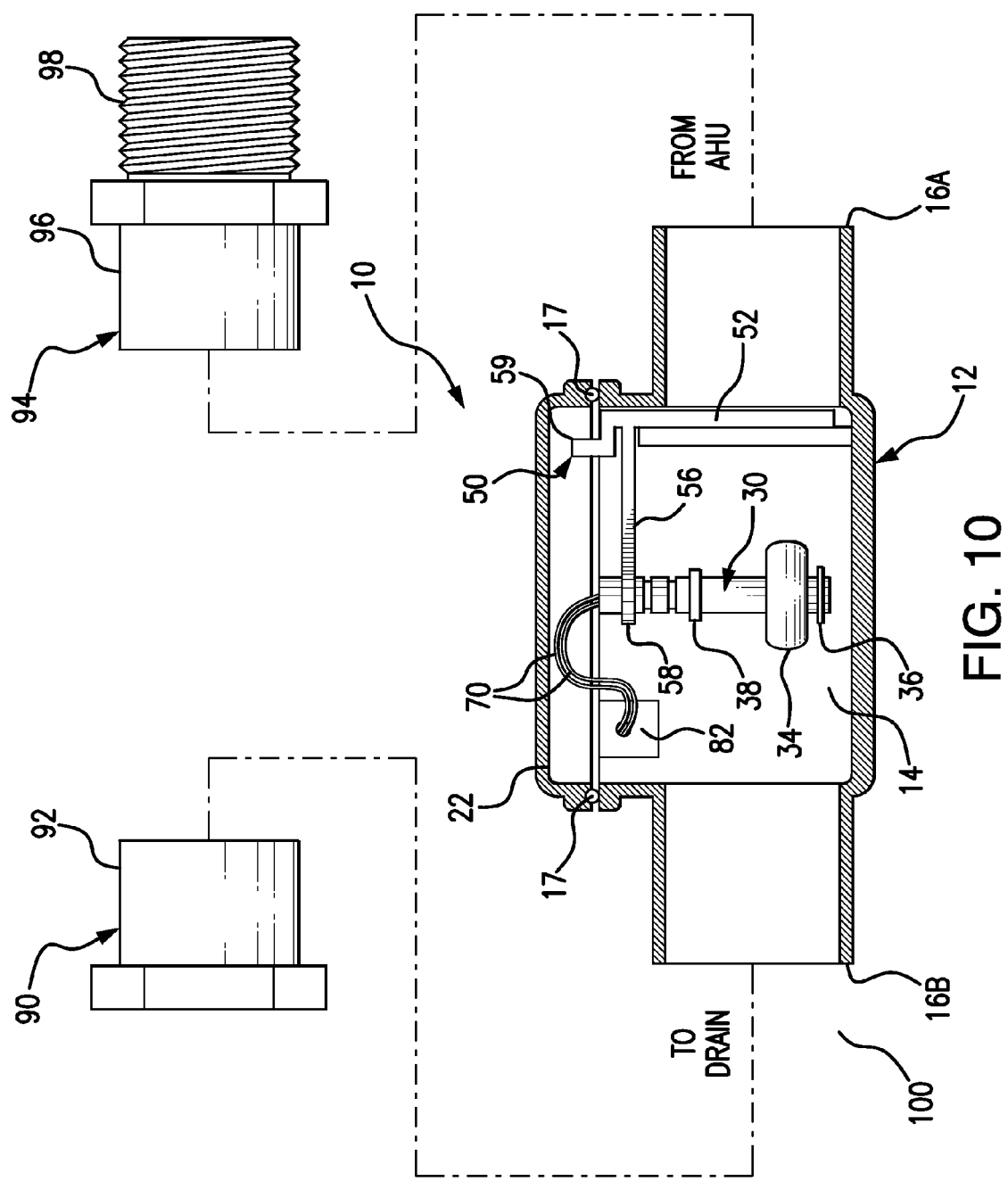
FIG. 10 is a side elevational view of the drain line access device of FIG. 1, shown partially exploded, with a cap for sealing one connector port opening and a coupling for attaching the opposite connector port of the device to the auxiliary outlet of a drain pan.

Referring to FIG. 10, a main body 12 having connector ports 16A and 16B can be converted into the embodiment of the device 10 shown in FIG. 9, as described above. Specifically, a cap 90 includes an annular wall 92 that is sized and configured for engaged, congruent receipt within the connector port 16B for producing an air tight and liquid tight seal between the cap 90 and the interior cavity 14 of the main body 12. The coupling 94 having a lengthwise channel extending therethrough includes an annular wall 96 at one end that is sized and configured for engaged, congruent receipt within the connector port 16A for achieving an air tight and liquid tight sealed connection. The opposite end of the coupling 94 includes a threaded exterior surface 98 that is sized for threaded, engaged attachment with the auxiliary outlet of a drain pan.

While the present invention has been shown and described in accordance with several preferred and practical embodiments, it is recognized that departures from the instant disclosure are contemplated within the spirit and scope of the present invention which are not to be limited except as defined in the following claims, as interpreted under the Doctrine of Equivalents.

What is claimed is:

1. An access device for inline installation to a drain line of a condensation producing source, said device comprising:
    a main body having an open top communicating with an interior cavity, and said main body including at least one connecting port sized and configured for sealed connection with the drain line;
    a top cover releasably securable to said main body to completely cover the open top of the main body, and the top cover being releasable from the open top for accessing the interior cavity of said main body;
    an overflow safety switch structured to be removably held in operable position within the interior cavity of said main body and below the top cover, and said overflow safety switch being structured and disposed for detecting the level of condensate liquid accumulating within the interior cavity of said main body and being further structured and disposed for sending a shut-off signal to the condensation producing source upon detecting the condensate liquid reaching a predetermined level within the interior cavity; and
    a bracket removably mounted to said main body entirely within the interior cavity and concealed below the top cover, and said bracket including an open clip member structured for removable and snap-fit attachment to adjustable positioning grooves of the overflow safety switch for holding the overflow safety switch in the operable position within the interior cavity with the overflow safety switch entirely concealed below the top cover, and the open clip member on said bracket being structured and disposed to allow removal and replacement of the overflow safety switch in attachment to said bracket without removing said bracket from mounted position to said main body within the interior cavity.

2. The device as recited in claim 1 wherein said overflow safety switch is a float switch.

3. The device as recited in claim 1 wherein said main body includes an input connecting port sized and configured for sealed connection with a first segment of the drain line extending between the condensation producing source and said device and an outlet connecting port sized and configured for sealed connection with a second segment of the drain line extending between said device and a drain discharge.

4. The device as recited in claim 3 further comprising:
    a cap having an annular cap wall that is sized and configured for congruent, engaged receipt within at least one of said input and outlet connector ports, and said cap being structured and disposed for forming an air tight and liquid tight seal between the annular cap wall and the at least one of said input and outlet connector ports; and
    a coupling having a first end and an opposite second end, wherein the first end includes an annular coupling wall surrounding a lengthwise channel, said annular coupling wall being sized and configured for congruent, engaged receipt within at least one of said input and outlet connector ports, and the second opposite end is sized and configured for attachment to an auxiliary outlet of a drain pan.

5. The device as recited in claim 1 wherein said bracket and said main body are correspondingly structured and disposed to allow removal and replacement of said bracket from mounted position within the interior cavity.

6. The device as recited in claim 5 wherein said bracket is removable from the interior cavity with said overflow safety switch held thereon.

7. The device as recited in claim 6 further comprising:
    a slot formed within the interior cavity of said main body;
    a mounting member on said bracket for sliding, movable receipt within the slot in the interior cavity of said main body for removably mounting said bracket to said main body;
    an arm extending outwardly from the mounting member and including a distal end; and
    the distal end of the arm including the open clip member for removable and adjustably positionable snap-fit attachment to the overflow safety switch for holding the overflow safety switch in the operable position within the interior cavity.

8. The device as recited in claim 1 wherein said main body includes a bottom and at least one side wall extending from the bottom and in surrounding relation to the interior cavity and terminating at a top rim surrounding the open top; and
    said at least one side wall including an opening for sealed passage of at least one wire conductor of the overflow safety switch therethrough.

9. The device as recited in claim 8 further comprising:
a closure piece on the at least on wire conductor of the overflow safety switch; and
the closure piece being congruently shaped, structured and configured to fit within the opening in the at least one side wall of said main body to seal the opening closed.

10. An access device for inline installation to a drain line of a condensation producing source, said device comprising:
a main body having an open top communicating with an interior cavity, and said main body including at least one connecting port sized and configured for sealed connection with the drain line;
a top cover releasably securable to said main body to completely cover the open top of the main body, and the top cover being releasable from the open top for accessing the interior cavity of said main body;
an overflow safety switch removably held in operable position entirely within the interior cavity of said main body and entirely concealed below the top cover, and said overflow safety switch being structured and disposed for detecting the level of condensate liquid accumulating within the interior cavity of said main body and being further structured and disposed for sending a shut-off signal to the condensation producing source upon detecting the condensate liquid reaching a predetermined level within the interior cavity; and
a bracket for holding said overflow safety switch in the operable position within the interior cavity of said main body, and said bracket and said main body being cooperatively structured and disposed for removably mounting said bracket to said main body so that said bracket is entirely within the interior cavity and concealed below the top cover, and said bracket including an open clip member structured for removable and snap-fit attachment to adjustable positioning grooves of the overflow safety switch for holding the overflow safety switch in the operable position within the interior cavity with the overflow safety switch entirely concealed below the top cover, and the open clip member on said bracket being structured and disposed to allow removal and replacement of the overflow safety switch in attachment to said bracket without removing said bracket from mounted position to said main body within the interior cavity.

11. The device as recited in claim 10 wherein said bracket is removable from the interior cavity with said overflow safety switch held thereon.

12. The device as recited in claim 11 further comprising:
a slot formed within the interior cavity of said main body;
a mounting member on said bracket for sliding, movable receipt within the slot in the interior cavity of said main body for removably mounting said bracket to said main body;
an arm extending outwardly from the mounting member and including a distal end; and
the distal end of the arm including the open clip member for removable and adjustably positionable snap-fit attachment to the overflow safety switch for holding the overflow safety switch in the operable position within the interior cavity.

13. The device as recited in claim 10 wherein said main body includes a bottom and at least one side wall extending from the bottom and in surrounding relation to the interior cavity and terminating at a top rim surrounding the open top; and
said at least one side wall including an opening for sealed passage of at least one wire conductor of the overflow safety switch therethrough.

14. An access device for inline installation to a drain line of a condensation producing source, said device comprising:
a main body having an open top communicating with an interior cavity, and said main body including at least one connecting port sized and configured for sealed connection with the drain line;
a top cover releasably securable to said main body to completely cover the open top of the main body, and the top cover being releasable from the open top for accessing the interior cavity of said main body;
an overflow safety switch removably held in operable position entirely within the interior cavity of said main body and entirely concealed below the top cover, and said overflow safety switch being structured and disposed for detecting the level of condensate liquid accumulating within the interior cavity of said main body and being further structured and disposed for sending a shut-off signal to the condensation producing source upon detecting the condensate liquid reaching a predetermined level within the interior cavity;
a bracket for holding said overflow safety switch in the operable position within the interior cavity of said main body, and said bracket and said main body being cooperatively structured and disposed for removably mounting said bracket to said main body so that said bracket is entirely within the interior cavity and concealed below the top cover, and said bracket including an open clip member structured for removable and snap-fit attachment to adjustable positioning grooves of the overflow safety switch for holding the overflow safety switch in the operable position within the interior cavity with the overflow safety switch entirely concealed below the top cover, and the open clip member on said bracket being structured and disposed to allow removal and replacement of the overflow safety switch in attachment to said bracket without removing said bracket from mounted position to said main body within the interior cavity; and
said main body includes a bottom and at least one side wall extending from the bottom and in surrounding relation to the interior cavity and terminating at a top rim surrounding the open top, and said at least one side wall including an opening for sealed passage of at least one wire conductor of the overflow safety switch therethrough.

15. The device as recited in claim 14 further comprising:
a slot formed within the interior cavity of said main body;
a mounting member on said bracket for sliding, movable receipt within the slot in the interior cavity of said main body for removably mounting said bracket to said main body;
an arm extending outwardly from the mounting member and including a distal end; and
the distal end of the arm including the open clip member for removable and adjustably positionable snap-fit attachment to the overflow safety switch for holding the overflow safety switch in the operable position within the interior cavity.

* * * * *